United States Patent [19]

Ishii

[11] 4,362,374
[45] Dec. 7, 1982

[54] FOCAL PLANE SHUTTER WINDING MECHANISM

[75] Inventor: Haruo Ishii, Wako, Japan

[73] Assignee: Asahi Kogaku Kogyo Kabushiki Kaisha, Tokyo, Japan

[21] Appl. No.: 305,770

[22] Filed: Sep. 25, 1981

[30] Foreign Application Priority Data

Oct. 3, 1980 [JP] Japan .......................... 55-141101[U]

[51] Int. Cl.³ .............................................. G03B 9/32
[52] U.S. Cl. .................................................. 354/242
[58] Field of Search ............... 354/205, 241, 242, 243, 354/244

[56] References Cited

U.S. PATENT DOCUMENTS

| 3,906,531 | 9/1975 | Ishii et al. | 354/242 |
| 3,913,117 | 10/1975 | Endo et al. | 354/242 |
| 4,084,170 | 4/1978 | Hashimoto et al. | 354/205 |
| 4,109,265 | 8/1978 | Hashimoto et al. | 354/244 |
| 4,164,370 | 8/1979 | Kimura et al. | 354/241 |
| 4,281,914 | 8/1981 | Tezuka et al. | 354/244 |

Primary Examiner—John Gonzales
Assistant Examiner—Alan Mathews
Attorney, Agent, or Firm—Sughrue, Mion, Zinn, MacPeak and Seas

[57] ABSTRACT

A shutter winding mechanism utilizes a flexible ribbon to rotate the top curtain drum. The ribbon preferably coupled to a reduced diameter cylindrical portion on the top curtain drum is connected at its other end to a shutter winding plate which is rotatable with the shutter winding lever.

7 Claims, 2 Drawing Figures

FOCAL PLANE SHUTTER WINDING MECHANISM

BACKGROUND OF THE INVENTION

This invention relates to a focal plane shutter winding mechanism.

A conventional focal plane shutter employs a winding mechanism in which a winding shaft turns the top curtain drum of the shutter through several gears to wind the shutter. Therefore, because of the rattling engagement of the gears, the shutter cannot be smoothly wound, and the shutter winding characteristics are unsatisfactory. Furthermore, because the gears are expensive, the manufacturing cost can be reduced only a limited amount.

SUMMARY OF THE INVENTION

Accordingly, an object of this invention is to provide a focal plane shutter winding mechanism in which the shutter winding characteristics are improved and which can be manufactured at a low cost.

Briefly, the focal plane shutter winding mechanism according to the present invention replaces the conventional gearing arrangement with a single flexible ribbon coupled to a cylindrical portion on the top curtain winding drum. The ribbon is coupled at its other end to a shutter plate rotatable by the shutter winding lever. With the use of only a single flexible ribbon in place of the complicated and undesirable gearing arrangement, both the shutter winding end shutter operating characteristics are significantly smoother, and the shutter mechanism can be manufactured at a lower cost.

BRIEF DESCRIPTION OF THE DRAWINGS

In the drawings:

FIG. 1 is a plan view showing the state of a winding mechanism according to this invention before the shutter is wound; and FIG. 2 is a plan view showing the state of the winding mechanism after the shutter has been wound.

DETAILED DESCRIPTION OF THE PREFERRED EMBODIMENTS

Figures 1, 2:
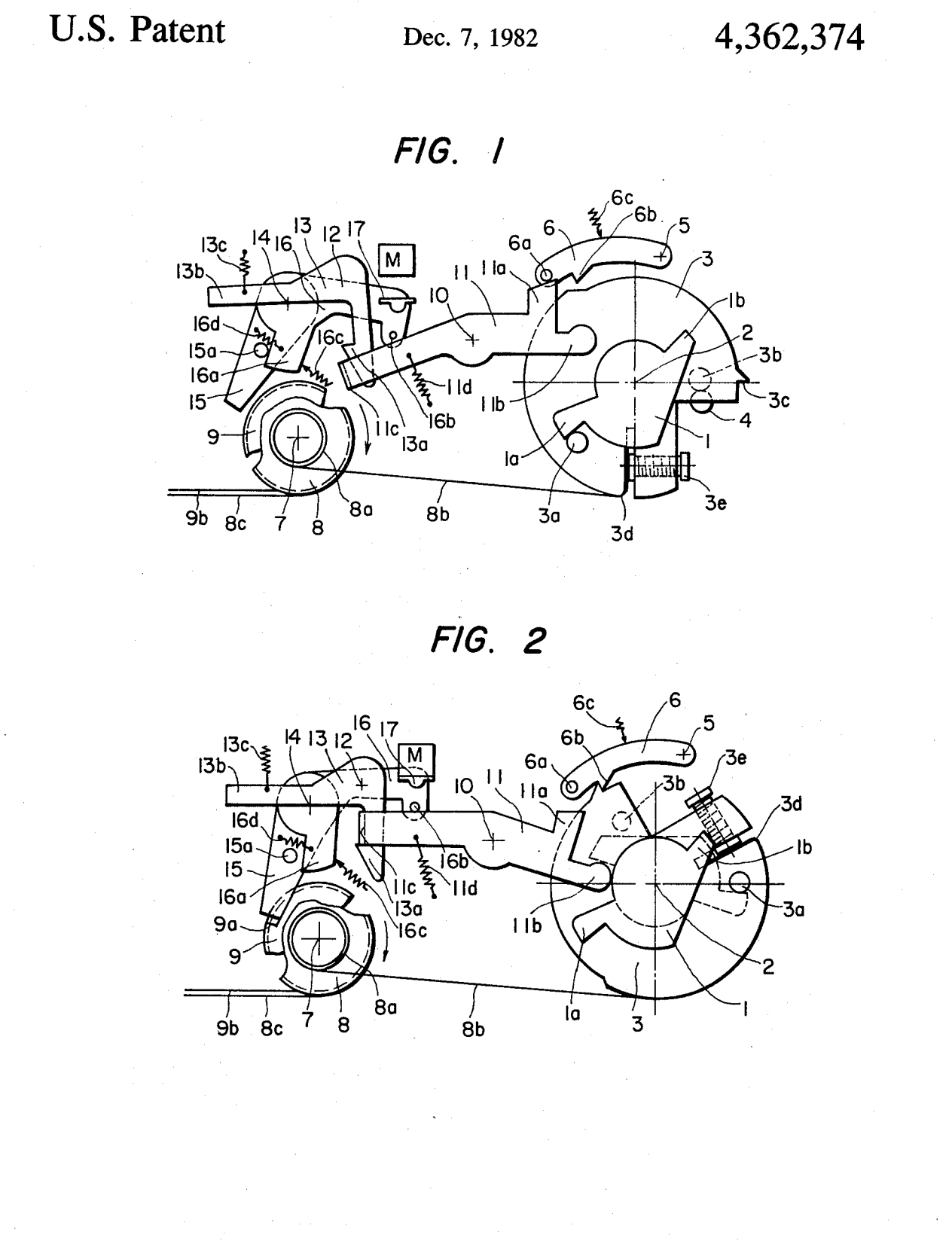

One example of a focal plane shutter winding mechanism according to this invention will now be described with reference to FIGS. 1 and 2.

A winding drive plate 1 has protrusions 1a and 1b. The winding drive plate 1 is turned counterclockwise through a predetermined angle about a shaft 2 in association with a camera's winding lever (not shown). After the winding operation has been accomplished, the winding drive plate 1 is restored, e.g., by the elastic force of a spring (not shown).

A shutter winding plate 3 is substantially in the form of a disk having a cut peripheral portion. The shutter winding plate 3 is rotatably mounted on the shaft 2, and pins 3a and 3b are provided on the upper and lower surfaces, respectively, of the shutter winding plate 3. Before the operated shutter is wound, as shown in FIG. 1 the pin 3a is in contact with the protrusion 1a of the winding drive plate 1, while the pin 3b is in contact with a stopper, e.g., a pin 4 which is embedded in a stationary part of the camera (not shown). A locking pawl 3c is provided at the periphery of the shutter winding plate 3, preferably, in the vicinity of the cut portion of the plate and locking lever 6 is provided near the shutter winding plate 3. The locking lever 6 is urged to turn around a shaft 6 by a spring 6c. The locking lever has a locking pawl 6b on its inward surface, which is engaged with the locking pawl 3c as shown in FIG. 2 when the shutter winding operation has been completed.

In the figures, reference numeral 11 designates a control lever which is urged to turn counterclockwise about a shaft 10 by a spring 11d. One end portion of the control lever 11 is forked to have two protrusions 11a and 11b. The protrusion 11a is maintained in abutment against a pin 6a embedded in one end portion of the locking lever 6 until the shutter winding operation is accomplished, so as to prevent the locking lever 6 from being turned towards the shutter winding plate 3 by the spring 6c.

The other protrusion 11b of the control lever 11 is in the path of the protrusion 1b of the winding drive plate 1. Therefore, when the shutter winding operation has been accomplished, the protrusion 11b of the winding drive plate 1 strikes the protrusion 11b of the control lever 11 as indicated by the phantom line in FIG. 2 so that the control lever 11 is turned clockwise against the elastic force of a spring 11d. As a result, the protrusion 11a is disengaged from the pin 6a of the locking lever 6 so that the locking lever 6 is permitted to turn counterclockwise. At the same time, the locking pawl 3c of the shutter winding plate 3, which has turned together with the winding drive plate through the engagement of the protrusion 1a and the pin 3a, is engaged with the locking pawl 6b to thereby prevent the return of the shutter winding plate 3.

The control lever 11 has a bent portion 11c at the other end. The bent portion 11c is engaged with an engaging portion 13a provided at one end of a start lever 13 which is urged to turn in a clockwise direction about a shaft 12 by a spring 13c. The other end portion 13b of the start lever 13 confronts with a mirror operating mechanism, etc. (not shown). When mirror operating mechanism, etc. are operated in response to the depression of the shutter button, the mirror operating mechanism, etc., act on the other end portion 13b of the start lever 13 to turn the latter 13 counterclockwise against the force of spring 13c, as a result of which the engaging portion 13a is disengaged from the bent portion 11c of the control lever 11.

In the figure, reference numeral 7 designates the rotary drum shaft of a single shaft type focal plane shutter. A top curtain drum 8 for winding a top curtain 8c and a bottom curtain drum 9 for winding a bottom curtain 9b are mounted on the shaft 7. More specifically, a typical configuration has the top curtain drum 8 fixedly mounted on the shaft 7, while the bottom curtain drum 9 is rotatably mounted on the shaft 7. Since the shutter curtains and ribbons are always pulled towards a winding shaft provided on one side by a coil spring which is incorporated in the winding shaft, the top curtain drum 8 and the bottom curtain drum 9 are urged to turn clockwise as indicated by the arrow. As is well known, when the top curtain drum 8 thus urged is caused to turn counterclockwise by the winding operation, the bottom curtain drum 9 is also turned counterclockwise through an engaging member or the like provided between these drums 8 and 9.

In order to transmit the winding operation to the top curtain drum 8, a small-diameter portion 8a of the drum 8 is coupled through a flexible ribbon 8b to the shutter winding plate 3. One end portion of the flexible ribbon 8b is wound on the small-diameter portion 8a, and the other end portion of the ribbon 8b is inserted in an elongated groove 3d which is cut in the shutter winding plate 3 in such a manner that it extends towards the center of the shutter winding plate. This end portion of the ribbon 8b is fixedly secured to one side wall of the elongated groove 3d by a screw 3c which is threaded into the portion of the shutter winding plate 3 which is defined by the above-described cut and the elongated groove 3d. Thus, as the winding operation is carried out, the ribbon 8b is wound on the circumferential wall of the shutter winding plate 3.

The winding mechanism of this invention further comprises a substantially L-shaped magnet lever 16 which is relatively strongly urged by a spring 16c to turn in a clockwise direction about a shaft 14. A pin 16b is embedded in one end protrusion of the magnet lever 16, and the pin 16b abuts against one edge of the control lever 11 under the elastic force of the spring 16c. An iron piece 16 is rotatably mounted on the end portion of the magnet lever 16 which is closest to the aforementioned protrusion where the pin 16b is provided. As was described above, when the winding operation has been accomplished the protrusion 1b of the winding drive plate 1 strikes the protrusion 11b of the control lever 11 to turn the lever 11 clockwise. In this operation, since the pin 16b is abutted against the edge of the control lever 11, the magnet lever 16 is turned counterclockwise, so that the iron piece 17 is attracted by a magnet M which is positioned to confront the iron piece 17. A spring 16d is connected between the other end portion 16a of the magnet lever 16 and a bottom curtain locking lever 15 which is also mounted on the shaft 14, and the other end portion 16a of the magnet lever 16 abuts against a pin 15a provided on the bottom curtain locking lever 15. Therefore, as the magnet lever 16 is turned counterclockwise, the bottom curtain locking lever 15 is also pulled in a counterclockwise direction. As a result, when the winding operation has been completed, the end portion of the bottom curtain locking lever is engaged with a locking protrusion formed on the bottom curtain drum 9, as shown in FIG. 2, to prevent the return rotation of the bottom curtain drum 9.

The operation of the winding mechanism of this invention will now be briefly described. When, under the condition that the shutter has been operated as shown in FIG. 1, the winding lever (not shown) is turned counterclockwise, the winding drive plate 1 is turned counterclockwise so that the protrusion 1a pushes the pin 3a of the shutter winding plate 3 to turn the plate 3 counterclockwise. The winding drive plate 1 reaches the position indicated by the phantom line in FIG. 2 at the completion of the winding operation, whereupon the protrusion 11b of the control lever 11 to turn the lever 11 clockwise. As a result, the protrusion 11a of the control lever 11 is disengaged from the pin 6a of the locking lever 6 to allow the lever 6 to turn counterclockwise, so that the locking pawl 6b of the locking lever 6 is engaged with the locking pawl 3c of the shutter winding plate 3 to prevent the return rotation of the shutter winding plate 3.

On the other hand, as the control lever 11 is turned clockwise as described above, the bent portion 11c engages the engaging portion 13a of the start lever 13, while the pin 16b of the magnet lever 16 is pushed by the control lever 11. Therefore, the magnet lever 16 is turned counterclockwise, the iron piece 17 is attracted by the magnet M, and the bottom curtain locking lever 15 is turned counterclockwise.

As the shutter winding plate 3 is turned counterclockwise as described above, the top curtain drum 8 is turned counterclockwise through the flexible ribbon 8b, and the top curtain drum 8 therefore winds the top curtain ribbon 8c against the tension on the winding shaft side. At the same time, the bottom curtain drum 9 is turned counterclockwise to wind the bottom curtain 9b. At the completion of the winding operation, the engaging protrusion 9a of the bottom curtain drum 9 engages the end portion of the locking lever 15 which has turned counterclockwise, to prevent the bottom curtain drum 9 from returning due to the tension on the winding shaft side. Therefore, as the winding lever is restored, the winding drive plate 1 is returned to the original position.

When the shutter button is depressed to operate the mirror operating mechanism, etc, to push the end portion 13b of the start lever 13 to turn the lever 13 counterclockwise, the start lever 13 is disengaged from the bent portion 11c of the control lever. Therefore, the control lever 11 is turned counterclockwise by the spring 11d, so that the protrusion 11a pushes the pin 6a of the locking lever. The locking pawl 6b is then disengaged from the locking pawl 3c, so that the shutter winding plate 3 is turned clockwise to allow the ribbon 8b to move to the left. Thus, the top curtain drum is turned clockwise to release the top curtain.

The magnetic force of the magnet M is terminated in a well known manner by an exposure control circuit after a predetermined period of time, so that the iron piece 17 on the magnet lever 16 is no longer attracted by the magnet M. Therefore, the magnet lever 16 is turned clockwise by the spring 16c and then the locking lever 15 is also turned clockwise through abutment of the lever 16 with the pin 15a. Thus, the bottom curtain drum 9 is released to turn in a clockwise direction and thereby release the bottom curtain.

In the winding mechanism according to this invention, the shutter winding plate is coupled through the flexible ribbon to the top curtain drum so that the drive force is transmitted through the ribbon, as described above. Therefore, the shutter can be wound or released more smoothly than conventional mechanisms using gears. Thus, the shutter winding characteristics are much improved. Furthermore, the shutter employing the winding mechanism of this invention can run smoothly and therefore not only shutter winding but also shutter performance is greatly improved. Still further, since it is unnecessary to use expensive gears, the manufacturing cost can be considerably reduced. Thus, the advantages of this invention should be easily appreciated.

What is claimed is:

1. In a focal plane shutter mechanism of the type having a top curtain biased for movement in a shutter curtain running direction and a top curtain drum on which said top curtain is to be wound, a shutter winding mechanism comprising:
    a shutter winding plate;
    means for rotating said shutter winding plate in a shutter winding direction; and
    a flexible ribbon coupling said shutter winding plate and said top curtain drum for rotating said top curtain drum to wind said top curtain when said shutter winding plate is rotated in said shutter winding direction.

2. A focal plane shutter winding mechanism as defined in claim 1, wherein said top curtain drum comprises a body portion onto which said top curtain is wound and a reduced diameter cylindrical portion, and said flexible ribbon is coupled to said cylindrical portion.

3. A focal plane shutter winding mechanism as defined in claim 1 or 2, wherein said shutter winding plate has a shutter wound position at which said top curtain is wholly wound, said mechanism further comprising:
- a locking pawl on the outer periphery of said shutter winding plate;
- a locking lever for engaging said locking pawl when said shutter winding plate is in said shutter wound position to thereby prevent rotation of said shutter winding plate in a top curtain unwinding direction.

4. A focal plane shutter winding mechanism as defined in claim 3, wherein said shutter mechanism further includes a bottom curtain and a bottom curtain drum which is rotated in a bottom curtain winding direction together with said top curtain drum when said shutter winding plate is rotated in said shutter winding direction, said shutter winding mechanism further comprising:
- a bottom curtain locking lever having a locking position at which it prevents rotation of said bottom curtain drum in a shutter running direction;
- means for moving said bottom curtain locking lever toward its locking position when said shutter winding plate is in said shutter wound position; and
- means for holding said bottom curtain locking lever in its locking position after release of said shutter winding plate.

5. A focal plane shutter winding mechanism as defined in claim 4, wherein said means for moving said bottom curtain locking lever to its locking position comprises:
- a control lever biased toward a first position and movable to a second position;
- means for moving said control lever to its second position when said shutter winding plate is at said shutter wound position;
- an intermediate lever movable between first and second positions and biased toward its first position, said intermediate lever being moved its second position by said control lever when said control lever is moved to its second position; and
- means coupling said intermediate lever and said bottom curtain locking lever for moving said bottom curtain locking lever to its locking position when said intermediate lever is moved to its second position.

6. A focal plane shutter winding mechanism as defined in claim 5, wherein said means for holding comprises a magnet for holding said intermediate lever in its second position for a period of time after release of said top curtain.

7. A focal plane shutter winding mechanism as defined in claim 5, further comprising means for locking said control lever in its second position, shutter release being accomplished by releasing said means for locking said control lever to thereby permit said control lever to move to its first position, said control lever at its first position disengaging said shutter winding plate locking lever from said pawl on the periphery of said shutter winding plate.

* * * * *